INVENTORS
PLINY G. HOLT
WILLIAM M. OGDEN

BY

ATTORNEYS

United States Patent Office 3,296,421
Patented Jan. 3, 1967

3,296,421
CATAPULT ACCUMULATOR PRESSURE
COMPUTER
Pliny G. Holt, Bethesda, Md., and William M. Ogden, Newtown Square, Pa., assignors to the United States of America as represented by the Secretary of the Navy
Filed June 3, 1964, Ser. No. 372,434
7 Claims. (Cl. 235—150.22)

The invention described herein may be manufactured and used by or for the Government of the United States of America for governmental purposes without the payment of any royalties thereon or therefor.

The present invention relates to the launching of aircraft from the deck of an aircraft carrier by a steam catapult and more particularly to a computer for determining the correct accumulator launching pressure.

Steam catapults used by the United States Navy are operated at various steam pressures, depending upon such factors as the particular aircraft to be launched, its weight and configuration, and the wind over the deck (WOD) at the time the aircraft is launched.

Under the present operating procedure, the catapult deck officer (CDO) has the important duty, during launching operations, of determining and verifying the establishment of the correct accumulator launching pressure. The present method of determining the pressure involves the use of a series of launching bulletin tables. The CDO must carry these tables with him during operations and refer to them whenever there is a change, for example, in aircraft type, aircraft weight or wind over deck (WOD) conditions. Each type of Navy aircraft requires a table or group of tables. In practice the CDO select the proper table(s) according to aircraft type, then selects the proper column according to weight. This gives him the minimum take-off air speed required. It is incumbent upon the CDO to decide how much greater than minimum the actual take-off air speed will be by mentally taking adjustments for factors such as WOD, free air temperature, catapult cylinder elongation condition, etc. He then seeks the proper row in the selected column which will indicate the accumulator launching p.s.i. for the condition considered. At the same time, he must inform the pilot of the end air speed at which he may expect to be launched. This must be done rapidly, on a busy deck with a high noise level, and under either day or night conditions. All these factors raise the possibility of confusion and error.

An object of the present invention is to alleviate the aforesaid problems and provide a computer for indicating the proper accumulator pressure necessary for launching an aircraft from an aircraft carrier.

Another object is to provide a rapid, reliable and accurate indication of the proper accumulator pressure necessary for launching an aircraft from an aircraft carrier.

Still another object of the present invention is to provide the aircraft pilot with the information concerning his launching speed in a rapid, accurate and reliable manner.

These and other objects and features of the invention will become apparent to those skilled in the art as the disclosure is made in the following description of an embodiment of the invention as illustrated in the accompanying sheet of drawing in which.

A typical catapult system includes a launching engine which consists of two slotted launching engine cylinders, two piston assemblies, a shuttle, two water brake cylinders, and associated structures. The twin launching engine cylinders, each containing a piston, are located parallel to each other in a trough underneath the flight deck. Each piston is coupled to the shuttle. Steam drives the piston assemblies forward within the launching cylinders, and the forward motion of the pistons is transmitted through the shuttle to the aircraft being launched. The water brake cylinders stop the motion of the pistons and the shuttle at the end of the power run.

A flow control system, which can be operated automatically or manually controls the admission of steam from the ship's boilers to the steam receivers or accumulators. These accumulators store the steam so received near the catapult until it is used by the catapult. A series of launching valves control the flow of steam from the accumulators into the launching cylinders while exhaust valves control its exhaust. The launching valves and the exhaust valves are operated hydraulically by the sequence of operation of the control system, by means of the launching valve control valve and the exhaust valve control valve, respectively.

The pressure needed for the launching of a particular type of aircraft from an aircraft carried may be determined from standard work and energy equations and may be calculated by $$P=KWV^2$$

where:

$P$=launching pressure in p.s.i.
$K$=constant which is a function of gravity, piston area, and length of working stroke.
$W$=weight of vehicle in pounds.
$V$=catapult end speed in knots, that is the speed that the vehicle in traveling at the end of the catapult; this speed being the sum of the aircraft's thrust and the catapult thrust.

Figure 4:
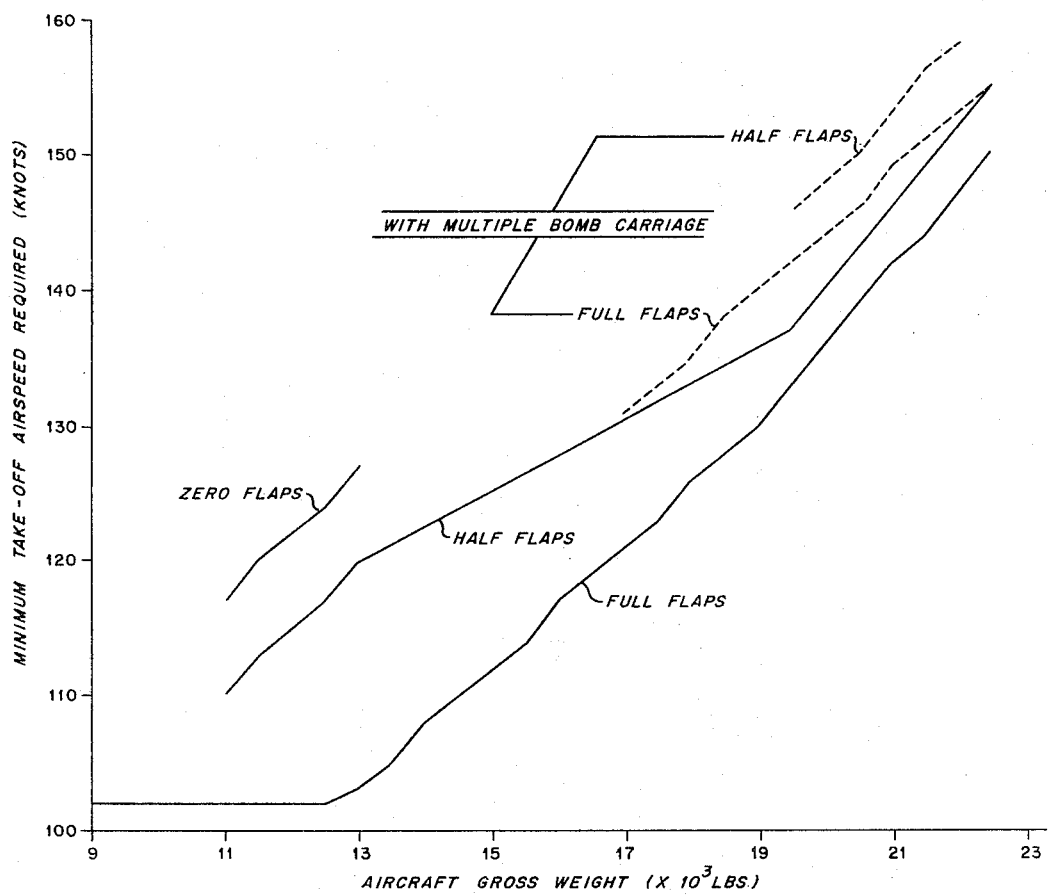
FIG. 4 is an exemplary minimum take-off air speed curve the values of which have been programmed within the computer of FIG. 1.

Each particular aircraft, depending upon the configuration, flap position and the gross weight thereof has a particular empirically obtained minimum take-off air speed which is required in order for the aircraft to complete a satisfactory launch. This minimum take-off air speed $V_1$ can be determined from a graph, an example of which is shown in FIG. 4. When the value so obtained is modified by the wind and temperature factors acting upon the aircraft and aircraft carrier, a value V indicative of the catapult end speed is obtained from which a value for the pressure necessary to obtain the catapult end speed may be obtained.

Figure 1:
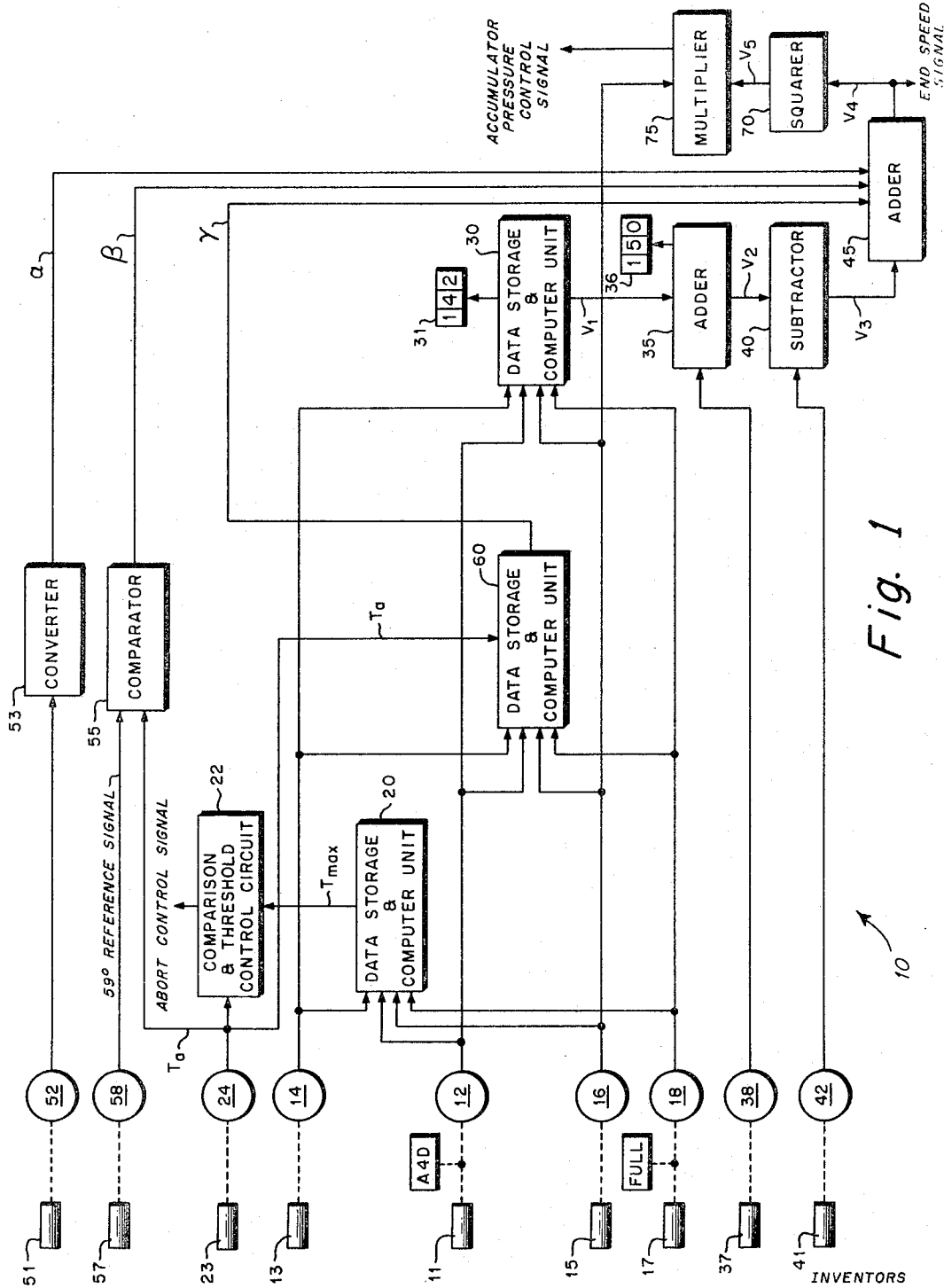
FIG. 1 represents a schematic block diagram of a catapult accumulator pressure computer.

Referring now to FIG. 1 it may be seen that the computer generally noted at 10 has certain values set in by various control knobs. It is understood that the use of the knob symbol is not limiting and that the inputs to the computer may be actuated either mechanically or electronically, as by a servo system. Knob 11 provides an analog input representative of the type of aircraft to be launched from the aircraft carrier. Such aircrafts include the F3H, AD–5W, A4D, F9F and others. The A4D has has been selected for purposes of the present disclosure and the selection thereof should not be considered limiting. Control knob 13 provides an analog input representative of the configuration of a particular aircraft to be launched. The configuration value is concerned with the bomb racks, stores with which the aircraft may be equipped at the time of launch. For example, the A4D aircraft may be equipped with a multiple bomb carriage and if the aircraft is to be launched with the same, a value so indicating is provided to the computer 10 through knob 13. A value indicative of the gross weight of the aircraft is provided as an input to the computer through knob 15 and includes such factors as aircraft weight per se, fuel, ammunition, bomb loads, and crew. Knob 17 provides an analog input indicative of the aircraft's flap position which may be zero, half or full.

Figure 2:
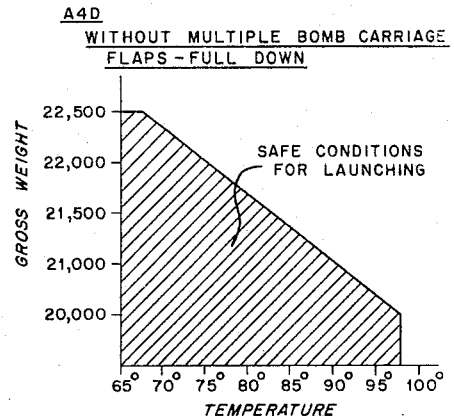
FIG. 2 is an exemplary safe-launch-conditions curve, the values of which have been programmed within the computer of FIG. 1.

The analog signals set in by knobs 11, 13, 15 and 17 are supplied to analog-to-digital converters, 12, 14, 16, and 18, respectively, of known conventional construction. The converted signals, now in digital format, are fed to a data storage and computer unit 20, of conventional design and construction, which contains therein information concerning the safe temperature zone for lauching each aircraft having a specified combination of parameters concerning aircraft type, configuration, gross weight and flap settings. As an example of the information stored within the unit 20, FIG. 2 represents a graph of the safe temperatures at which an A4D type aircraft may be launched under particular predetermined parameters. Unit 20 will provide in response to the combination of signals received an output $T_{max}$ which is a value indicative of the maximum temperature at which the aircraft having the selected parameters may be launched. For example, a combination of input parameters including input signals indicating aircraft type—A4D; configuration—without bomb carriage; flap settings—full down; and gross weight—21,000 pounds, can be fed to unit 20 by setting the corresponding knobs 11, 13, 17 and 15. Unit 20 would responsively produce an output indicative of 90° which is the maximum temperature for the specific aircraft having that weight as shown in the graph of FIG. 2. This output is fed as an input to a comparison and threshold control circuit 22 which additionally receives an input $T_a$ via knob 23 and analog-to-digital converter 24 of a value representative of the air temperature at the time of launch. Circuit 22 compares $T_{max}$ with $T_a$ and if it is found that $T_a$ is greater than $T_{max}$ an abort control signal is provided indicating that the launch should be aborted. This abort signal may be used for many purposes. For example, the signal may be used to provide a visual readout signal to the CDO or may be used to cut the catapult power.

The values set into the computer through knobs 11, 13, 15 and 17 indicative of the aircraft type, configuration, weight and flap settings are additionally supplied to a second data storage and computing unit 30 which contains stored therein the empirical information relating to the minimum take-off air speed required by each of the various aircrafts under the variable parametric conditions. Unit 30 is similar to unit 20. FIG. 4 is exemplary of some of the information stored in unit 30 and indicates the required minimum take-off air speed of an A4D aircraft under various conditions of weight, flap position and configuration.

Memory unit 30 provides in response to the selected parameters set in an output $V_1$ representative of the minimum take-off air speed required. Continuing the above example, the input parameters including the input signals indicating an A4D aircraft without bomb carriage having flap settings full down and a gross weight of 21,000 pounds would also respectively be fed to unit 30; and unit 30 would responsively produce an output indicative of 142 knots, which is the minimum take-off air speed required therefor as shown in the graph of FIG. 4. This output value $V_1$ is read out at indicator 31 and is further supplied to an adder 35 which in addition to the $V_1$ signal receives an input δ A/S through knob 37 and analog-to-digital converter 38. δ A/S is an incremental increase in the minimum required take-off air speed which is inserted into the computer by the CDO in accordance with additional environmental characteristics, for example, pilot performance, and aircraft age and performance. Adder 35 produces an output $V_2$ which is the sum of the values of $V_1$ and δ A/S and is representative of the desired take-off air speed. This signal $V_2$ in turn is fed as an input to subtractor 40 and also to the optionally included indicator 36. A comparison of the indications by indicators 36 and 31 indicates that the CDO has set in an incremental increase of 8 knots which was added to the minimum required take-off air speed by reason of such factors as pilot performance and aircraft performance.

In order to compensate for the wind velocity prevailing over the deck of the aircraft carrier, an input representative of the wind velocity is provided to the subtractor 40 of the computer 10 through knob 41 and analog-to-digital converter 42. The resultant output $V_3$ from subtractor 40 is provided as an input to adder 45.

Various "wind correction factors" are additionally supplied as inputs to adder 45 and are now described. A first correction is made by reason of the elongation of the launching engine cylinders which contain the pistons for transmitting motion to the aircraft being launched. Continued use of the cylinder during a period of time will result in the elongation thereof due to heating and a correction factor α (in knots) is supplied to the computer through knob 51 and analog-to-digital converter 52. The signal representative of this value is applied to adder 45.

Secondly, an additional correction is made since the empirical data described above is based on a standard day defined as follows:

Pressure=29.92 inches of mercury
Temperature=59° F.
Density=.002378 lb. sec.$^2$/ft.$^4$ That is, in view of the difference between the standard day temperature of 59° F. and the actual existing temperature at time of launch, an air density correction factor β is supplied as a component part of the "wind correction factors." This air density correction factor β is obtained by suppling a comparator 55 with the standard day temperature, here 59°, through knob 57 and analog-to-digital converter 58 and comparing the same with the representation of the air temperature signal $T_a$ supplied to the computer 10 through knob 23. Comparator 55 provides as an output, for example, a β correction factor of one knot for each 10° F. The existing launching temperature differs from the standard free air temperature of, for example, 59° F. The signal representative of this value is applied to adder 45.

Figure 3:
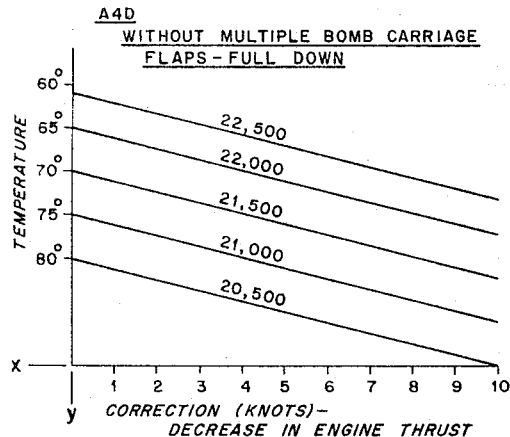
FIG. 3 illustrates an exemplary correction curve for decrease in engine thrust the values of which have been programmed into the computer of FIG. 1.

In view of the change in the thrust obtained from an aircraft engine due to temperature differential from the standard day temperature, a correction factor γ is also applied to adder 45 and is obtained as now described. The values representative of aircraft type, configuration, weight and flap setting are applied to data storage unit and computer 60 through the respective knobs and converters. This unit 60 has stored therein empirical data relating to the decrease in engine thrust due to variations in temperature from the standard day for each aircraft type under all conditions relating to configuration, weight and flap setting. FIG. 3 is illustrative of a small portion of the information contained within the unit 60. Additionally, storage unit 60 has supplied as an input thereto the air temperature signal $T_a$ existing at the time of launch. The output γ from unit 60 produced in response to the particular combination of parameters set in is a correction factor which represents a "wind correction" in knots for decrease in the engine thrust and is fed to adder 45.

As noted above, each of the correction factors α, β and γ are supplied to the adder 45 which provides an output $V_4=V$ which is indicative of the catapult end speed. This signal is available for presentation to the CDO for subsequent communication or presentation to the pilot. $V_4$ is additionally fed to squarer 70 for squaring the value of the velocity component $V_4$ and provides an output $V_5$ to a multiplying unit 75. A signal representative of the weight of the aircraft is additionally applied to the multiplier unit 75 through knob 15 and analog-to-digital converter 16. Multiplier 75 in addition to multiplying the values of aircraft weight and $V_5$ also compensates for the constant K which is representative of the piston area and the length of stroke. The resultant output from multiplier 75 is a signal P which is representative of the pressure at which the accumulator should be operated in order to obtain a satisfactory launch of the particular aircraft selected. The signal P so obtained may be applied to a readout mechanism which would indicate to the CDO the required pressure in p.s.i.

As an example of the operation of the above described computer let it be assumed that an A4D aircraft is to be launched from an aircraft carrier. Let it further be assumed that the A4D is not equipped with the multiple bomb carrier and that the aircraft is being launched with the flaps in a full down position and weighs 21,000 lbs. gross weight. An air temperature may be assumed for purposes of illustration as being 80° F.

When this information is supplied as inputs to the computer the data unit 20 will determine, by reason of the information contained therein relating to FIG. 2, that the maximum temperature allowed ($T_{max}$) for the aircraft launching is 90° F. This value is compared by the comparison and threshold control circuit 22 with the input $T_a$ of 80° and a "go condition" signal is provided since the actual temperature is less than $T_{max}$.

With the aforesaid characteristics and parameters being fed to data unit 30, which contains therein the information illustrated in FIG. 4, an output ($V_1$) of 142 knots will be obtained which is the minimum take-off air speed required. This minimum take-off air speed forms a basis for the remaining computations to be accomplished by elements 35, 40, 45, 70 and 75.

As a further example of the actual determination of the correction factor $\gamma$ due to decrease in engine thrust, the storage unit 60 is supplied with information shown in FIG. 3. When further supplied with an input temperature of $T_a$ of 80° and an aircraft weight of 21,000 lbs. in addition to the other parameters, the unit 60 will provide an autput $\gamma$ of 5 knots to the adder 45.

It should be understood that, although the above description is related to a computer employing electronic techniques, the same way be constructed of mechanical and electromechanical elements. For example, the data storage device may consist of a group of selectable cams each cam being cut to provide an output indicative of a stored value therein. Obviously, many modifications and variations of the present invention are possible in the light of the above teachings. It is, therefore, to be understood that, within the scope of the appended claims, the invention may be practiced otherwise than as specifically described.

What is claimed is:

1. A computer for determining and indicating the pressure required in an accumulator of the type used in launching an aircraft from an aircraft carrier comprising:
   first adjusting means providing a combination of separate and discrete input signals indicative of the aircraft type, configuration, flap mode and weight;
   first information storage and readout means connected to said first adjusting means for receiving the input signal combination therefrom and responsive thereto for providing an output signal indicative of the minimum required aircraft take-off air speed, said storage and readout means having stored therein discrete output signals of minimum take-off speed for each receivable input signal combination;
   second adjusting means providing an input signal indicative of the free air temperature;
   second information storage and readout means connected to said first and second adjusting means for receiving the combination of input signals therefrom and responsive thereto for providing an ouput signal indicative of an engine thrust correction speed, said second storage and readout means having stored therein discrete output signals of the correction speed for each receivable combination of input signals;
   third adjusting means providing an input signal indicative of the velocity of the wind over the aircraft carrier deck;
   summing means connected to said first and second storage and readout means and said third adjusting means for receiving respectively therefrom said output signals and said input signal and providing in response thereto an output signal representative of the catapult end speed;
   squaring means connected to said summing means for receiving said output signal thereof for providing in response thereto an ouput signal indicative of the catapult end speed squared; and
   multiplier means connected to said squaring means for receiving the output signal thereof and connected to said first adjusting means for receiving said input signal representative of the aircraft weight for providing an ouput indicative of the proper accumulator pressure.

2. A computer for determining and indicating the pressure required in an accumulator of the type used in launching an aircraft from an aircraft carrier comprising:
   first adjusting means providing a combination of separate and discrete input signals indicative of the aircraft type, configuration, flap mode and weight;
   first information storage and readout means connected to said first adjusting means for receiving said combination of input signals therefrom and responsive thereto for providing an output signal indicative of the minimum required take-off air speed, said first storage and readout means having stored therein discrete output signals of minimum take-off speed for each receivable input signal combination;
   second adjusting means providing an input signal indicative of a selected incremental increase in minimum required aircraft take-off air speed;
   first adder means connected to said first storage and readout means and to said second adjusting means for respectively receiving therefrom said output signal and said input signal and responsive thereto for providing an output signal representing the desired take-off air speed;
   third adjusting means providing an input signal indicative of the velocity of the wind over the aircraft carrier deck;
   summing means operatively connected to said first adder means and to said third adjusting means for receiving therefrom said output signal and said input signal indicative of the velocity of the wind over the aircraft carrier deck and responsive thereto for providing an output signal representative of the catapult end speed;
   circuit means operatively connected to said summing means for receiving said output signal and operatively connected to said first adjusting means for receiving said input signal representative of aircraft weight for providing a computer output indicative of the pressure necessary to satisfactorily launch the aircraft.

3. The computer as defined in claim 2 further including:
   fourth adjusting means providing a reference input signal indicative of a reference temperature and an input signal indicative of the free air temperature at the time of launch;
   comparator means connected to said fourth adjusting means for receiving said input signals and responsive thereto for providing an output signal indicative of correction speed; and
   said summing means being operatively connected to said comparator means for receiving said output signal from said comparator means and providing said output signal indicative of said catapult end speed including said air density change correction speed.

4. The computer as defined in claim 2 further including:
fourth adjusting means providing an input signal indicative of the free air temperature at the time of launch;
second information storage and readout means connected to said first and fourth adjusting means for receiving said input signals indicative of the aircraft type, configuration, flap mode and weight and free air temperature and responsive thereto for providing an output signal indicative of a changed engine thrust correction speed, and readout means having stored therein discrete output signals of correction speed for the change in the aircraft engine thrust due to temperature variation from a standard temperature for each receivable input signal combination; and
said summing means being operatively connected to said second storage and readout means for receiving said output signal therefrom and providing said output signal indicative of said catapult end speed including said changed engine thrust correction speed.

5. The computer as defined in claim 4 which further includes:
fifth adjusting means providing a reference input signal indicative of a reference temperature;
comparator means connected to said fourth and fifth adjusting means for receiving said input signals thereof and responsive thereto for providing an output signal indicative of a correction speed for the change in air density by reason of the difference between said free air and reference temperatures;
sixth adjusting means providing an input signal indicative of one of a multiplicity of launching catapult engine cylinder elongations;
converter means connected to said sixth adjusting means for receiving said elongation input signal and responsive thereto for providing an output signal indicative of a corresponding one of a multiplicity of correction speeds each attributable to catapult engine cylinder elongation; and wherein
said summing means comprises subtractor means connected to said first adder means for receiving said output signal representing the desired take-off air speed and connected to said third adjusting means for receiving therefrom said input signal indicative of the velocity of the wind and responsive thereto for providing a subtractor output signal indicative of desired take-off air speed corrected for wind velocity, and second adder means connected to said subtractor means for receiving said subtractor output signal, connected to said second storage and readout means for receiving said output signal representative of correction speed for change in the aircraft engine thrust due to temperature variations from a standard temperature and connected to said comparator means and to said converter means for receiving the output signals thereof, said second adder means providing in response thereto said summing means output signal indicative of the catapult end speed including said correction speeds for engine thrust change, air density change and cylinder elongation.

6. The computer as defined in claim 5 wherein said circuit means includes:
squaring means connected to said second adder means of said summing means for receiving said output signal thereof for providing an output signal indicative of the end speed squared; and
multiplier means connected to said squaring means for receiving said output signal thereof and connected to said first adjusting means for receiving said input signal indicative of the aircraft weight for providing in response thereto said computer output representative of the pressure necessary to satisfactorily launch the aircraft.

7. A computer according to claim 6 further comprising:
third storage and readout means connected to said first adjusting means for receiving said combination of input signals and responsive thereto for providing an output signal indicative of the maximum safe launch temperature, said third storage and readout means having stored therein discrete output signals of maximum safe launch temperature for each receivable input signal combination; and
comparison and threshold means connected to said third storage and readout means for receiving the output signal thereof and connected to said fourth adjusting means for receiving said input signal indicative of free air temperature and responsive thereto for providing an additional computer output indicative that said free air temperature exceeds said maximum safe launching temperature.

References Cited by the Examiner

UNITED STATES PATENTS

| | | | |
|---|---|---|---|
| 3,077,110 | 2/1963 | Gold | 235—150.22 |
| 3,120,606 | 2/1964 | Eckert et al. | 235—160 |
| 3,129,323 | 4/1964 | Stout et al. | 235—151.1 |
| 3,159,738 | 12/1964 | James et al. | 235—150.22 |

MALCOLM A. MORRISON, *Primary Examiner.*

M. P. HARTMAN, *Assistant Examiner.*